(12) United States Patent
Jankowski et al.

(10) Patent No.: US 6,673,130 B2
(45) Date of Patent: Jan. 6, 2004

(54) METHOD OF FABRICATION OF ELECTRODES AND ELECTROLYTES

(75) Inventors: Alan F. Jankowski, Livermore, CA (US); Jeffrey D. Morse, Martinez, CA (US)

(73) Assignee: The Regents of the University of California, Oakland, CA (US)

( * ) Notice: Subject to any disclaimer, the term of this patent is extended or adjusted under 35 U.S.C. 154(b) by 348 days.

(21) Appl. No.: 09/881,952

(22) Filed: Jun. 15, 2001

(65) Prior Publication Data

US 2002/0193241 A1 Dec. 19, 2002

(51) Int. Cl.[7] .................................. H01M 6/00
(52) U.S. Cl. ................ 29/623.5; 427/115; 427/421; 204/192.15; 204/192.17; 429/30; 429/33; 429/40; 429/44; 429/45
(58) Field of Search .............................. 429/115, 421, 429/30, 33, 40, 44, 45; 29/623.5; 204/192.15, 192.17

(56) References Cited

U.S. PATENT DOCUMENTS

| | | | |
|---|---|---|---|
| 3,802,878 A | * 4/1974 | Lindstrom | 419/2 |
| 3,899,356 A | * 8/1975 | Groult et al. | 429/42 |
| 4,289,802 A | * 9/1981 | Micheli | 427/125 |
| 4,576,883 A | * 3/1986 | Hope et al. | 429/312 |
| 5,741,406 A | 4/1998 | Barnett | 204/192.15 |
| 6,007,683 A | 12/1999 | Jankowski et al. | 204/192.17 |
| 6,218,318 B1 | * 4/2001 | Ohkura et al. | 438/782 |

OTHER PUBLICATIONS

Chicago Tribune Space–age Power Nears Reality Jun. 5, 2000 Sec. 4.

* cited by examiner

*Primary Examiner*—Bruce F. Bell
(74) *Attorney, Agent, or Firm*—Alan H. Thompson; Ann M. Lee

(57) ABSTRACT

Fuel cell stacks contain an electrolyte layer surrounded on top and bottom by an electrode layer. Porous electrodes are prepared which enable fuel and oxidant to easily flow to the respective electrode-electrolyte interface without the need for high temperatures or pressures to assist the flow. Rigid, inert microspheres in combination with thin-film metal deposition techniques are used to fabricate porous anodes, cathodes, and electrolytes. Microshperes contained in a liquid are randomly dispersed onto a host structure and dried such that the microsperes remain in position. A thin-film deposition technique is subsequently employed to deposit a metal layer onto the microsperes. After such metal layer deposition, the microspheres are removed leaving voids, i.e. pores, in the metal layer, thus forming a porous electrode. Successive repetitions of the fabrication process result in the formation of a continuous fuel cell stack. Such stacks may produce power outputs ranging from about 0.1 Watt to about 50 Watts.

36 Claims, 4 Drawing Sheets

METHOD OF FABRICATION OF ELECTRODES AND ELECTROLYTES

The United States Government has rights in this invention pursuant to Contract No. W-7405-ENG-48 between the United States Department of Energy and The University of California for the operation of Lawrence Livermore National Laboratory.

BACKGROUND OF THE INVENTION

The simplest fuel cell comprises two electrodes separated by an electrolyte. The electrodes are electrically connected through an external circuit, with a resistive load lying in between them. Solid polymer electrochemical fuel cells generally employ a membrane electrode assembly, or "MEA," comprising a solid polymer electrolyte membrane, or "PEM," also known as a proton exchange membrane, disposed between the two electrodes. The electrodes are formed from porous, electrically conductive sheet material, typically carbon fiber paper or cloth, that allows gas diffusion. The PEM readily permits the movement of protons between the electrodes, but is relatively impermeable to gas. It is also a poor electronic conductor, and thereby prevents internal shorting of the cell.

A fuel gas is supplied to one electrode, the anode, where it is oxidized to produce protons and free electrons. The production of free electrons creates an electrical potential, or voltage, at the anode. The protons migrate through the PEM to the other electrode, the positively charged cathode. A reducing agent is supplied to the cathode, where it reacts with the protons that have passed through the PEM and the free electrons that have flowed through the external circuit to form a reactant product. The MEA includes a catalyst, typically platinum-based, at each interface between the PEM and the respective electrodes to induce the desired electrochemical reaction.

In one common embodiment of the fuel cell, hydrogen gas is the fuel and oxygen is the oxidizing agent. The hydrogen is oxidized at the anode to form $H^+$ ions, or protons, and electrons, in accordance with the chemical equation:

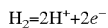
$$H_2 = 2H^+ + 2e^-$$

The $H^+$ ions traverse the PEM to the cathode, where they are reduced by oxygen and the free electrons from the external circuit, to form water. The foregoing reaction is expressed by the chemical equation:

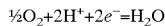
$$\tfrac{1}{2}O_2 + 2H^+ + 2e^- = H_2O$$

Solid Oxide Fuel cells (SOFCs) operate using a mechanism similar to PEMs. The main difference is that instead of the electrolyte material comprising a polymer material capable of exchanging protons, the electrolyte material comprises a ceramic material capable of exchanging electrons.

Electrode layers are usually porous in order to allow the fuel and oxidant to flow to the electrode-electrolyte interfaces. Typical fuel cells that use porous electrode materials are bulk structures that require significant manifolding and pressures to readily deliver the fuel to the electrode-electrolyte interface. Pressing and sintering metal powders to promote adhesion, then sandwiching two such electrodes around an electrolyte layer to form the fuel cell form these porous electrodes. Connecting two or more fuel cells in series can form fuel cell stacks. During operation, such fuel cells and stacks thereof need high temperatures and pressures to provide fuel and oxidant to the electrode-electrolyte interface and to remove by-products therefrom. A need still exists for a method to fabricate porous electrodes that reduces or eliminates such high temperatures or pressures required to assist the flow of the fuel and oxidant to the electrode-electrolyte interface.

SUMMARY OF THE INVENTION

Aspects of the invention include a method comprising: forming a first dispersion by placing a plurality of rigid, inert, solid microspheres into a first liquid, depositing a first array of microspheres from the first dispersion on a surface of a host structure, removing the first liquid from the host structure, coating the deposited first array of microspheres with a layer of conductive material to form a first electrode layer, and removing the first array of microspheres to form a porous first electrode layer.

Aspects of the invention further include A method comprising: forming a first dispersion by placing a first plurality of rigid, inert, solid microspheres selected from the group consisting of glass and polystyrene having average cross-sectional diameters between about 0.1 $\mu$m and about 5.0 $\mu$m into a first liquid, depositing a first array of microspheres by spraying the first dispersion onto a surface of the host structure, wherein the host structure contains gas flow channels, the channels having pores of diameter smaller than the average cross-sectional diameter of the microspheres, removing the first liquid from the host structure at a temperature between about 70° C. and about 150° C., coating the first array of microspheres with a first layer of conductive material with a thickness between about 0.5 $\mu$m and about 2.0 $\mu$m, and removing the first array of microspheres to form a porous first electrode.

Aspects of the invention further include a method comprising: forming a first dispersion by placing a plurality of rigid, inert, solid microspheres selected from the group consisting of glass and polystyrene having cross-sectional dimensions between about 0.1 $\mu$m and about 5.0 $\mu$m into an aqueous liquid, depositing an array of the microspheres from the dispersion by spraying the dispersion onto a surface of an electrolyte layer of a fuel cell, removing the liquid from the electrolyte layer by drying at a temperature between about 70° C. and about 150° C., coating the deposited array of the microspheres with a first layer of conductive material with a thickness between about 0.5 $\mu$m and about 2.0 $\mu$m using a thin film deposition technique, and removing the array of the microspheres to form a first porous electrode.

DETAILED DESCRIPTION

Fuel cell stacks, particularly those utilized in MEMS-based fuel cells, include an anode layer, an electrolyte layer that can include catalysts, and a cathode layer. It is desirable to have porous electrodes so that the fuel and oxidant can easily flow to the respective electrode-electrolyte interface without the need for high temperatures or pressures to assist the flow. Described herein is a method for forming a large density of very small pores in a thin-film electrode structure. The method can be used to fabricate porous electrodes useful in fuel cells such as, a solid oxide fuel cell (SOFC), or a proton exchange membrane fuel cell (PEMFC) sometimes referred to as a solid polymer fuel cell (SPFC). Power densities measured in output per unit area may be achieved up to about 1 W/cm$^2$ for PEMFCs and up to about 2 W/cm$^2$ for SOFCs. Typically power densities range from about 0.1 W/cm$^2$ to about 0.4 W/cm$^2$. The power output of these fuel cells ranges from about 0.1 Watts to about 50 Watts. Typical outputs range from about 1 Watt to about 10 Watts.

Figure 1:
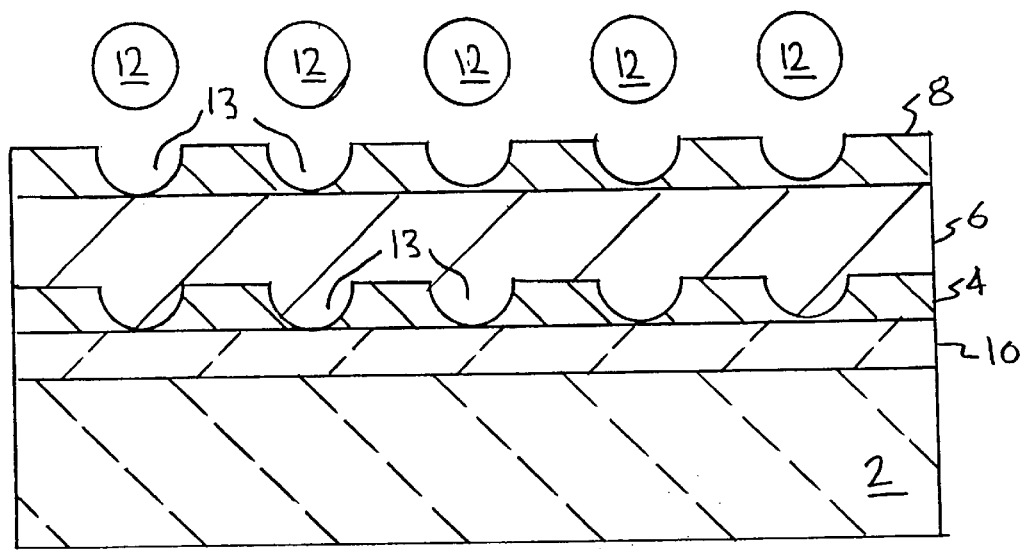
FIG. 1 shows a cross-sectional view of an electrode-electrolyte-electrode component of a fuel cell formed using microspheres.

FIG. 1 is an illustration of an electrode-electrolyte-electrode component of a thin-film fuel cell fabricated using microspheres. Referring to FIG. 1, a host structure 2 supports a porous anode 4, an electrolyte layer 6, and a porous cathode 8. Optionally, a membrane support layer 10 may be positioned between host structure 2 and porous anode 4. In this method, microspheres 12 are used to form pores 13 in the electrode layers.

Figure 2:
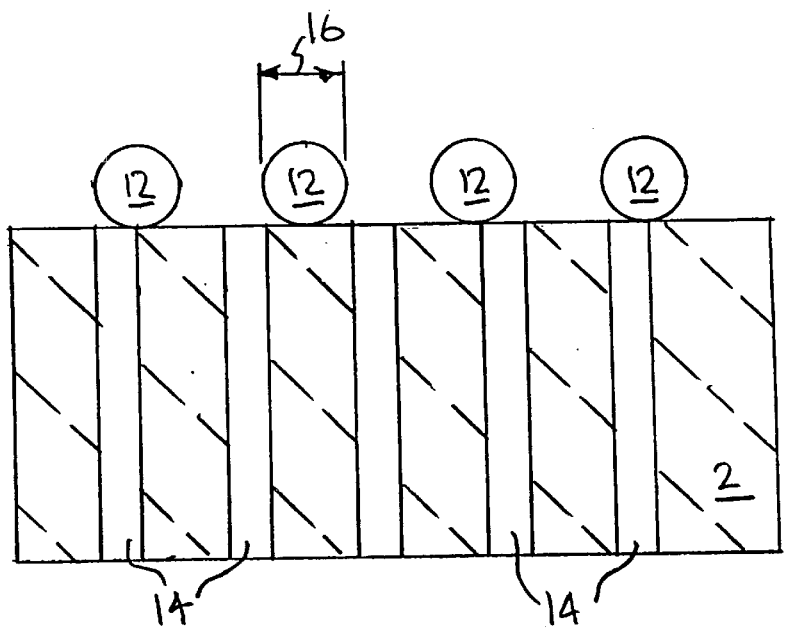
FIG. 2 shows microspheres deposited on a porous host structure.

Referring to FIG. 2, host structure 2 is usually a silicon wafer which is often covered by a thin layer of silicon nitride, or silicon dioxide. Microspheres 12 are made of a rigid, inert, solid material, e.g., glass or polystyrene, and are commercially available in cross-sectional diameters ranging from about 0.1 μm to greater than about 1 mm. A microsphere with a cross-sectional diameter ranging from about 0.1 μm to about 5.0 μm is highly effective for use in constructing fuel cell electrodes. Typical cross sectional dimensions of the gas flow channels are in the range from about 0.2 μm to about 5.0 μm.

Referring again to FIG. 2, microspheres 12 are deposited onto the surface of host structure 2. Host structure 2 can contain gas flow channels 14. Gas flow channels 14 can be smaller in diameter than microspheres 12 to ensure that microspheres 12 will not fall into flow channels 14 during modification of host structure 2.

Figure 3:
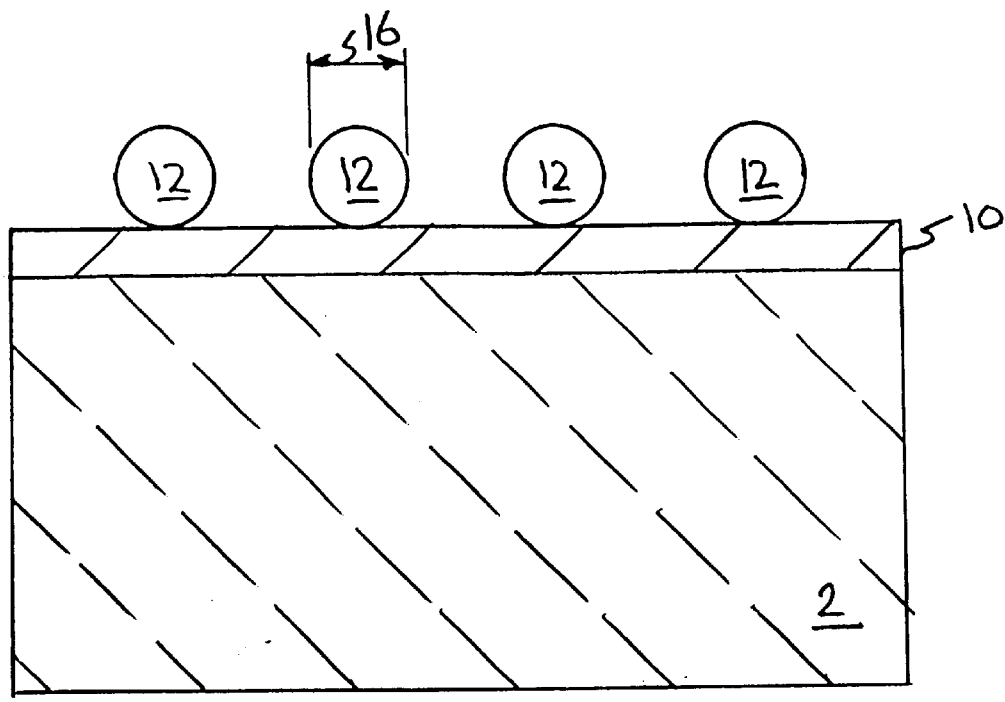
FIG. 3 shows microspheres deposited on a host structure having a membrane support layer to be post-processed to form a porous flow field structure.

Referring to FIG. 3, microspheres 12 are deposited onto the surface of host structure 2 where host structure 2 can be post-processed to form gas flow channels after an electrode has been formed on the surface of host structure 2. A thin membrane 10 made of silicon nitride or silicon dioxide can be present at the top of host structure 2 to provide an etch stop for subsequent processing to form channels in the silicon host structure.

Referring to both FIG. 2 and FIG. 3, microspheres 12 are deposited onto the surface of host structure 2 where the electrode is to be formed by placing microspheres 12 into a liquid, e.g., water or isopropyl alcohol. With the appropriate conditions of spin speed, deposition time, and microsphere concentration in the liquid, microspheres 12 are randomly distributed over the surface of host structure 2 at a desired density such that microspheres 12 typically do not touch one another, and are separated from one another by a distance on the order of up to an average cross-sectional diameter 16 of one microsphere. This process can be accomplished by spraying the solution onto the host structure as it spins or moves linearly past the source of the spray, similar to paint spraying equipment.

Figure 4:
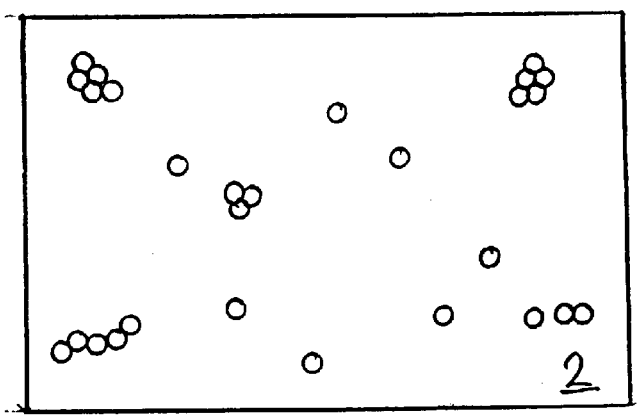
FIG. 4 shows a top view of the array of microspheres on a host structure.

Referring now to FIG. 4, microspheres 12 that are deposited onto host structure 2 are held in position by surface tension forces. Host structure 2 can then be dried or baked at a temperature high enough to completely remove the liquid portion of the spun on slurry, e.g., 100° C. at atmospheric pressure if the liquid is water.

Figure 5:
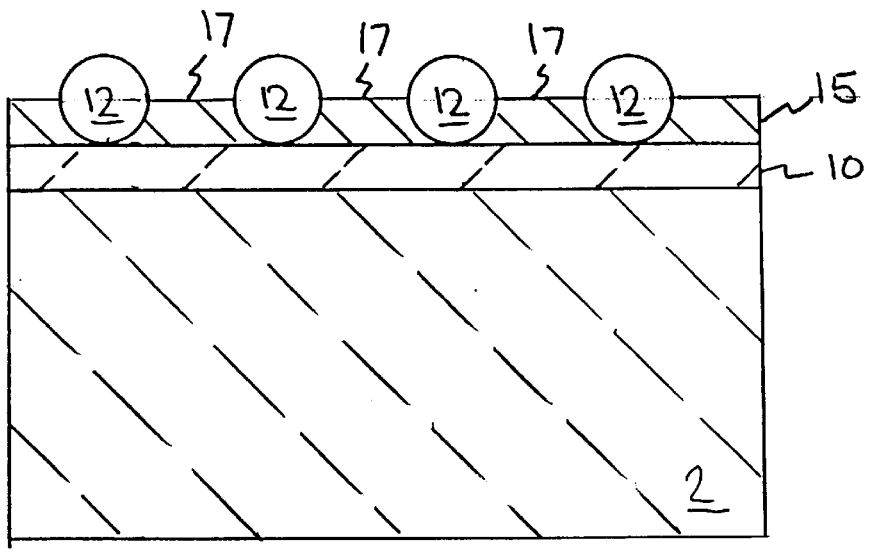
FIG. 5 shows a conductive material layer deposited onto microspheres deposited on a host structure using sputter deposition.
Figure 6:
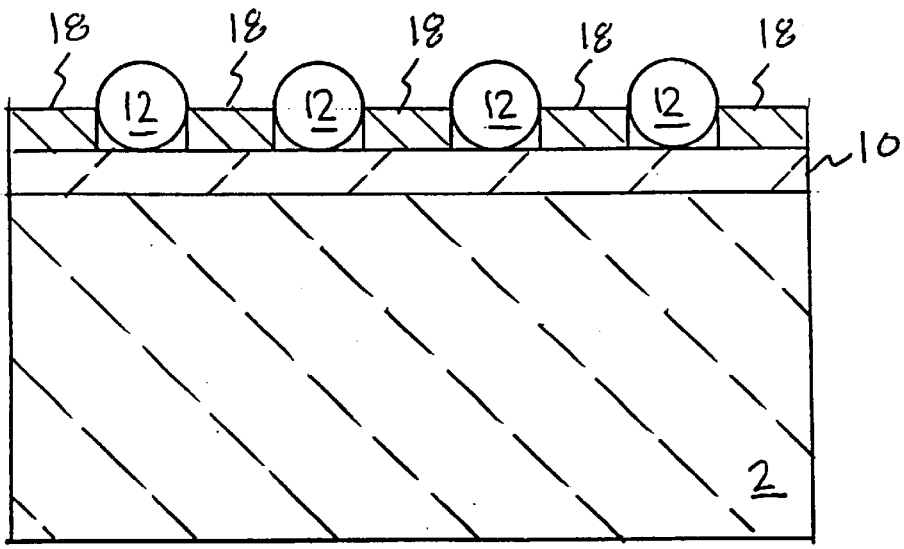
FIG. 6 shows a conductive material layer deposited onto microspheres deposited on a host structure using electron beam deposition.
Figure 7:
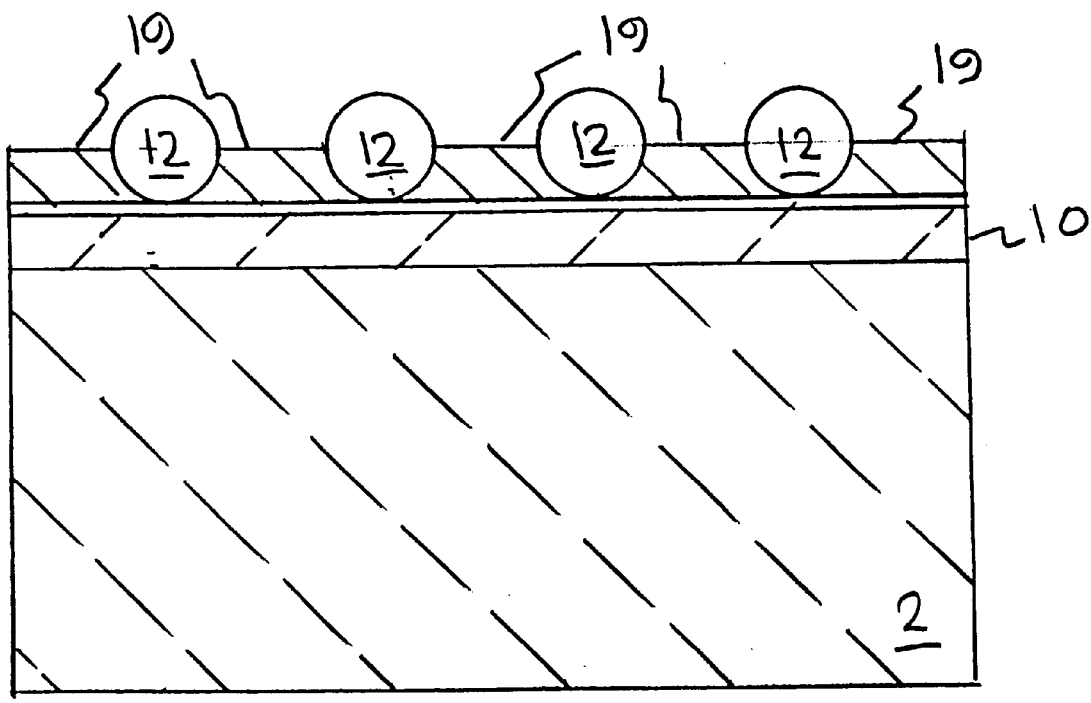
FIG. 7 shows a conductive material layer deposited onto microspheres deposited on a host structure using electrodeposition.

Following completion of the process to distribute microspheres 12 over the surface of host structure 2, an anode 4 is formed using thin film deposition techniques such as sputter deposition, electron beam evaporation, or electrodeposition. Referring now to FIG. 5, sputter deposition is especially suited for fabricating electrodes since the deposited conductive material 15 tends to fully fill-in a plurality of spaces 17 between the deposited microspheres 12, except in the regions where there is contact between microspheres 12 and the surface of host structure 2. Referring now to FIG. 6, electron beam deposition is directional and will coat the surface of host structure 2 with a conductive material layer 18 according to the shadow of the microsphere's diameter. Referring now to FIG. 7, electrodeposition requires a metal seed layer (not shown) beneath the microspheres, with subsequent electrodeposited conductive material 19 filling up around microsphere 12. The metal seed layer is first deposited over the surface of membrane 10 on host structure 2 by electron beam evaporation or sputter deposition. This layer contains a thin layer of a metal typically used for electroplating, for example Au (200R).

The methods described herein result in the formation of the first layer of the electrode-electrolyte-electrode component illustrated by FIG. 1, i.e., anode 4. The electrolyte layer, electrolyte 6, is formed using one of the thin film deposition techniques previously described. The same methods used to form anode 4 can then be employed to form the next electrode layer, cathode 8, on top of electrolyte 6.

A conductive material electrode layer comprises the appropriate material for a particular fuel cell application. For SOFCs, anode 4 can be nickel, or nickel followed by a codeposited nickel-electrolyte material and the cathode can, for example, be silver, platinum, or Lanthanum Strontium Manganate. For PEMFCs, anode 4 can comprise nickel or carbon, followed by a catalyst layer that can comprise platinum or platinum-ruthenium with an electrolyte material such as Nafion, followed by a cathode catalyst such as platinum, and electrode material such as carbon, nickel, silver or other metal.

The electrodes are of an appropriate thickness to provide adequately low resistance to extract the current from the fuel cell, typically having an average cross-sectional diameter between about 0.5 μm and about 2.0 μm. It is desirable that the microsphere diameter be sufficiently large enough that the microspheres are not fully encapsulated in the freshly deposited conductive material layer. After the electrode layer is deposited, microspheres 12 are removed leaving voids or pores 13 in the thin film electrode (shown in FIG. 1). Several techniques for removal of the microspheres include selective wet or dry etching, ultrasonic or physical agitation, or dipping in a liquid which releases microspheres 12 from the surface allowing them to float into the liquid.

As described, this technique can be used to form porous electrodes directly on bulk electrolytes, or to form a continuous fuel cell stack by subsequently depositing a continuous, dense electrolyte layer on the porous anode, then form a porous cathode layer on the electrolyte. The completed electrode structures will have pores that are slightly smaller in size than the microspheres' diameter because the coating forms around the surface in contact with the host structure. These pores provide an opening to expose the catalyst-electrolyte layers to oxidant and fuel, making available a region for rapid diffusion of oxidant and fuel species. Similarly, the pores will enable the removal of reaction byproducts (e.g. water) from the electrode layer.

Power output depends on the number of cells in a stack as well as the architecture of each individual cell. Power output may range from about 0.1 Watt to about 50 Watts. Power densities may range from about 1 W/cm$^2$ to about 2 W/cm$^2$.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

The invention claimed is:

1. A method comprising:
    forming a first dispersion by placing a plurality of rigid, inert, solid microspheres into a first liquid,
    depositing a first array of microspheres from said first dispersion on a surface of a host structure,
    removing said first liquid from said host structure,
    coating said deposited first array of microspheres with a layer of conductive material, and
    removing said first array of microspheres to form a first porous electrode layer.

2. The method of claim 1, further comprising the step of coating said first electrode layer with a thin conductive material coating to form an electrolyte layer.

3. The method of claim 2, wherein the thin film conductive material coating is applied by a thin film deposition technique.

4. The method of claim 2, further comprising the steps of:
    forming a second dispersion by placing a second plurality of rigid, inert, solid microspheres into a second liquid,
    depositing a second array of microspheres from said second dispersion on a surface of said electrolyte layer,
    removing said second liquid from said electrolyte layer,
    coating said deposited second array of microspheres with a second layer of conductive material, and
    removing said second array of microshperes to form a porous second electrode layer.

5. The method of claim 4, wherein said forming of the first electrode layer, the electrolyte layer and the second electrode layer is repeated to form a stack comprising two or more fuel cells.

6. The method of claim 5, wherein the power output of said stack is between about 0.1 Watt and about 50 Watts.

7. The method of claim 5, wherein the power density measured by the power output per unit area is between about 1 W/cm$^2$ and about 2 W/cm$^2$.

8. The method of claim 1, wherein said host structure is an electrolyte layer of a fuel cell.

9. The method of claim 1, wherein said microspheres are selected from the group consisting of glass and polystyrene.

10. The method of claim 1, wherein said microspheres have an average cross-sectional diameter between about 0.1 $\mu$m and about 1.0 mm.

11. The method of claim 1, wherein said microspheres have an average cross-sectional diameter between about 0.1 $\mu$m and about 5.0 $\mu$m.

12. The method of claim 1, wherein said host structure contains gas flow channels, said channels having pores that are smaller in diameter than said average cross-sectional diameter of the microspheres.

13. The method of claim 1, wherein said host structure has been previously processed to form gas flow channels to an electrode, said channels having pores and said host structure having a thin sacrificial membrane at the top of said pores.

14. The method of claim 1, wherein said first array of microspheres are deposited by spraying said first dispersion onto said host structure.

15. The method of claim 1, wherein said first liquid comprises water.

16. The method of claim 1, wherein said first liquid comprises isopropyl alcohol.

17. The method of claim 1, wherein said microspheres are distributed over the surface of the host structure such that the microspheres are separated from each other by a distance less than the size of said average cross-sectional diameter of one of the microspheres.

18. The method of claim 1, wherein the host structure is dried at a temperature high enough to completely remove the liquid portion of said first dispersion.

19. The method of claim 1, wherein the host structure is dried at a temperature in the range between 70° C. and 150° C.

20. The method of claim 1, wherein said layer of conductive material coating at least partially encapsulates said microspheres.

21. The method of claim 1, wherein the thin film deposition technique is sputter deposition, electron beam evaporation, or electrodeposition.

22. The method of claim 1, wherein said first electrode has a thickness between about 0.5 $\mu$m and about 2.0 $\mu$m.

23. The method of claim 22, wherein said layer of conductive material is applied using a thin film deposition technique.

24. The method of claim 3, wherein said layer of conductive material is applied using a thin film deposition technique.

25. The method of claim 23, wherein said forming of said first electrode layer, said electrolyte layer and said second electrode layer is repeated to form a stack comprising two or more fuel cells.

26. The method of claim 25, wherein the power output of said stack is between about 0.1 Watt and about 50 Watts.

27. The method of claim 25, wherein the power density measured by the power output per unit area is between about 1 W/cm$^2$ and about 2 W/cm$^2$.

28. The method of claim 1, wherein the microspheres are removed by selective wet etching.

29. The method of claim 1, wherein the microspheres are removed by selective dry etching.

30. The method of claim 1, wherein the microspheres are removed by ultrasonic agitation.

31. The method of claim 1, wherein the microspheres are removed by physical agitation.

32. The method of claim 26, further comprising the steps of:
    forming a second dispersion by placing a second plurality of rigid, inert, solid microspheres selected from the group consisting of glass and polystyrene having an average cross-sectional diameter between about 0.1 $\mu$m and about 5.0 $\mu$m into a second liquid,
    depositing a second array of microspheres by spraying said second dispersion onto a surface of said electrolyte layer of a fuel cell,
    removing said second liquid from said electrolyte layer at a temperature between about 70° C. and about 150° C., coating the deposited second array of microspheres with a second layer of conductive material with a thickness between about 0.5 $\mu$m and about 2.0 $\mu$m, and removing said second array of microshperes to form a second porous electrode.

33. The method of claim 1, wherein the microspheres are removed by dipping said electrode in a liquid.

34. The method of claim 1, further comprising the step of coating said first electrode layer with an electrolyte layer using a thin film deposition technique, wherein said electrolyte layer has a thickness between about 2.0 $\mu$m and about 50 $\mu$m.

35. A method comprising:

forming a first dispersion by placing a first plurality of rigid, inert, solid microspheres selected from the group consisting of glass and polystyrene having average cross-sectional dimensions between about 0.1 $\mu$m and about 5.0 $\mu$m into a first liquid, depositing a first array of microspheres by spraying said first dispersion onto a surface of said host structure, wherein said host structure contains gas flow channels, said channels having pores of diameter smaller than said average cross-sectional diameter of said microspheres, removing said first liquid from said host structure at a temperature between about 70° C. and about 150° C., coating said first array of microspheres with a first layer of conductive material with a thickness between about 0.5 $\mu$m and about 2.0 $\mu$m, and removing said first array of microshperes to form a first porous electrode.

36. A method comprising:

forming a first dispersion by placing a plurality of rigid, inert, solid microspheres selected from the group consisting of glass and polystyrene having average cross-sectional dimensions between about 0.1 $\mu$m and about 5.0 $\mu$m into an aqueous liquid, depositing an array of said microspheres by spraying said first dispersion onto a surface of an electrolyte layer of a fuel cell, removing said first liquid from said electrolyte layer by drying at a temperature between about 70° C. and about 150° C., coating said deposited array of said microspheres with a first layer of conductive material between about 0.5 $\mu$m and about 2.0 $\mu$m thick using a thin film deposition technique, and removing said array of said microshperes to form a first porous electrode.

* * * * *